Figure 1:
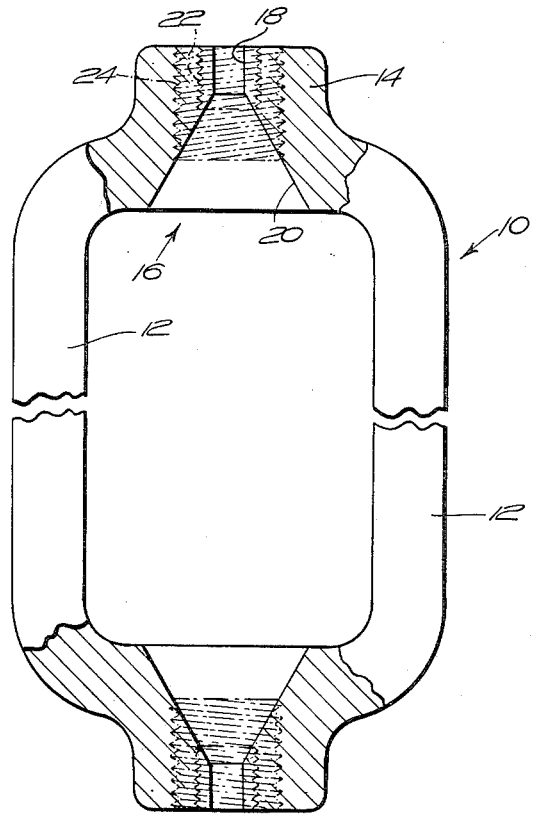

Nov. 20, 1962 P. C. SHERBURNE 3,065,006
TURNBUCKLE BLANK
Filed Nov. 26, 1958

INVENTOR.
PHILIP C. SHERBURNE
BY
*David D. McKenney*
ATTORNEY

3,065,006
TURNBUCKLE BLANK
Philip C. Sherburne, Rumford, R.I., assignor to Grinnell Corporation, Providence, R.I., a corporation of Delaware
Filed Nov. 26, 1958, Ser. No. 776,639
1 Claim. (Cl. 287—60)

This invention relates to turnbuckles and particularly to a turnbuckle blank adapted to connect threaded rod ends of varying diameters.

A turnbuckle body commonly assumes a form of two apertured cylindrical socket members joined by two parallel bars. The apertures in the socket members are initially formed of a diameter nearly equal to the diameter of the finished holes and the sockets are then threaded to accommodate rods of a given diameter which are joined by the turnbuckle. The diameter of the threaded hole in such instances is completely determined before manufacture of the turnbuckle and standardized proportions between hole diameter and length determine the length of each socket member.

In applications however where the diameter of the rod end is not known before manufacture, the turnbuckle blank must be threaded afterwards according to each user's requirements. Prior turnbuckle blank design has dictated that the axial thickness of each socket member, corresponding to the length of the hole to be threaded therein, be great enough to (proportionally) accommodate the greatest diameter rod end. For relatively small diameter rods the length of the hole is hence the same as that which accommodates a larger diameter rod.

In cutting the threads in the turnbuckle, the cumulative effect of any imperfections increases with length and finally becomes intolerable if the length of the threaded hole is great enough. Thread cutting inaccuracies in the rods themselves also contribute to difficulties in threading the rods into the socket members.

Another disadvantage of such prior turnbuckle blank design is the need of threading a hole of greater length than that necessary. This is particularly true in relatively small rod diameters wherein the length of the threads is much greater than necessary.

To overcome these difficulties, the present invention introduces a novel hole configuration in each socket member of the turnbuckle body. In its preferred form, the hole is partly of uniform diameter and partly frusto-conical. With this shape, the length of the tapped hole in the case of relatively small diameter rod ends never exceeds a certain predetermined amount and less material need be removed in the threading operation. Furthermore, the tapering sides of the frusto-conical portion permit a desired proportion between tapped hole length and rod diameter for all rod diameters accommodated by the turnbuckle.

Figure 2:
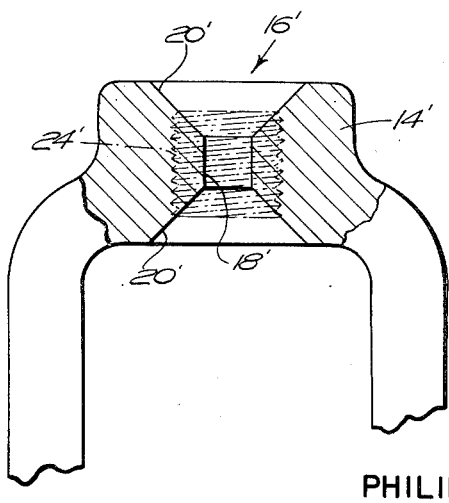

In the drawings:

FIG. 1 is a longitudinal cross-sectional view of a turnbuckle blank illustrating one embodiment of the invention, FIG. 2 is a view similar to FIG. 1 showing one end of a turnbuckle blank according to another embodiment.

Referring now to the drawings, FIG. 1 shows a turnbuckle body denoted generally by the numeral 10 which includes parallel bars 12 joining two cylindrical members 14. Each member 14 is provided with apertures 16 each of which in turn include portions 18 of uniform diameter and frusto-conical portions 20.

The diameter of portion 18 is very nearly that of the smallest diameter rod ends apt to be encountered and its length preferably a standardized proportion thereof. For such smaller rods, a threading device is inserted in portions 18, the threads cut and the turnbuckle is thus readied for use. For rods of larger diameter, the apertures 16 are bored out by a tapping tool to a larger diameter. This is indicated by the dotted thread lines 22. Even larger connecting rods would require the tapping of still larger holes, indicated by the dotted thread lines 24. By the assignment of a certain slope or taper to the frusto-conical portion 20, desired proportions between the diameter and length of any of the tapped holes such as 22 and 24 may be achieved.

FIG. 2 of the drawings shows one end of a modified blank. Here an aperture 16' includes two tapering portions 20' joined by a portion 18' of uniform diameter. Again, the slope or taper of portions 20' may be selected to give an arbitrary tapped hole, indicated by the dotted thread lines 24', any desired proportion between its length and diameter.

For convenience in manufacture, the portions 18 and 18' may be omitted leaving only the tapered portions 20 and 20'.

I claim:

A turnbuckle blank comprising a turnbuckle body having a socket member at at least one end, said socket member having a smooth aperture therethrough along an axis common to the longitudinal axis of said blank, said aperture including a first opening portion of uniform diameter at one end of said aperture, a second opening portion having a wall of frusto-conical configuration uniformly tapering from a large open end at the other end of said aperture to a small end at said uniform diameter portion and merging therewith at said small end of said tapering portion, the total length of said second tapering portion being greater than the length of said first uniform diameter portion, whereby said blank may be drilled and tapped for different rod diameters through a wide range of sizes, retaining sufficient material for adequately strong threaded unions in all sizes while limiting the length of the material in the threaded portion of said blank when utilized with small diameter rods, so as to prevent binding of turnbuckle threads with rod threads which often results from excessively long turnbuckle thread portions in these small diameters.

References Cited in the file of this patent
UNITED STATES PATENTS

| | | |
|---|---|---|
| 263,943 | Morse | Sept. 5, 1882 |
| 935,660 | Johnson | Oct. 5, 1909 |
| 1,000,149 | Bristol | Aug. 8, 1911 |
| 1,288,812 | Bishop | Dec. 24, 1918 |
| 1,981,594 | Frayer | Nov. 20, 1934 |
| 2,363,050 | Dewey | Nov. 21, 1944 |